(12) United States Patent
Xia et al.

(10) Patent No.: US 8,009,415 B2
(45) Date of Patent: Aug. 30, 2011

(54) SCREEN OF LAPTOP COMPUTER AND LAPTOP COMPUTER HAVING THE SAME

(75) Inventors: Xiaosong Xia, Beijing (CN); Huajun Dong, Beijing (CN); Xiufeng He, Beijing (CN); Xing Chen, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 275 days.

(21) Appl. No.: 12/208,627

(22) Filed: Sep. 11, 2008

(65) Prior Publication Data
US 2009/0067125 A1 Mar. 12, 2009

(30) Foreign Application Priority Data

Sep. 12, 2007 (CN) .................. 2007 2 0173096 U (51) Int. Cl.
*G06F 1/16* (2006.01)
(52) U.S. Cl. .................. 361/679.27; 349/58; 16/382
(58) Field of Classification Search ............. 361/679.27; 16/382, 258; 349/58
See application file for complete search history.

(56) References Cited

U.S. PATENT DOCUMENTS

| | | | | |
|---|---|---|---|---|
| 5,379,182 A * | 1/1995 | Fujimori et al. | ......... | 361/679.27 |
| 5,835,139 A * | 11/1998 | Yun et al. | ......... | 349/58 |
| 5,946,061 A * | 8/1999 | Kurihara et al. | ......... | 349/58 |
| 6,202,256 B1 * | 3/2001 | Bovio et al. | ......... | 16/382 |
| 6,212,067 B1 * | 4/2001 | Nakajima et al. | ......... | 361/679.27 |
| 6,272,006 B1 * | 8/2001 | Lee | ......... | 361/679.27 |
| 6,411,501 B1 * | 6/2002 | Cho et al. | ......... | 361/679.27 |
| 6,421,231 B1 * | 7/2002 | Jung | ......... | 361/679.27 |
| 6,430,039 B2 * | 8/2002 | Nakajima et al. | ......... | 361/679.27 |
| 6,525,790 B1 * | 2/2003 | Kan-o | ......... | 349/58 |
| 6,542,206 B1 * | 4/2003 | Saito | ......... | 349/58 |
| 6,654,078 B1 * | 11/2003 | Kato et al. | ......... | 349/58 |
| 6,774,959 B2 * | 8/2004 | Agata et al. | ......... | 349/58 |
| 6,816,213 B2 * | 11/2004 | Kato et al. | ......... | 349/58 |
| 6,859,357 B2 * | 2/2005 | Morimoto et al. | ......... | 361/679.55 |
| 6,989,986 B2 * | 1/2006 | Kumagai et al. | ......... | 361/679.27 |
| 6,992,884 B2 * | 1/2006 | Minaguchi et al. | ......... | 361/679.21 |
| 7,304,837 B2 * | 12/2007 | Lo et al. | ......... | 361/679.27 |
| 7,343,645 B2 * | 3/2008 | Li | ......... | 16/258 |
| 7,489,501 B2 * | 2/2009 | Hong et al. | ......... | 361/679.27 |
| 7,606,023 B2 * | 10/2009 | Konno et al. | ......... | 361/679.26 |

(Continued)

FOREIGN PATENT DOCUMENTS

CN 1945491 A 4/2007
EP 1 544 714 A2 6/2005

*Primary Examiner* — Lisa Lea-Edmonds
(74) *Attorney, Agent, or Firm* — Dickstein Shapiro LLP (57) ABSTRACT

The present invention relates to a screen of a laptop computer and a laptop computer having the same. And the laptop computer comprises: a back cover; a fixing body mounted on the back cover; a liquid crystal screen mounted on the fixing body; and a cover plate received on the fixing body, wherein the cover plate covers the liquid crystal screen and the fixing unit, and the area of the cover plate corresponding to the liquid crystal screen is transparent. The fixing body comprises a fixing frame and/or supporting member. Each supporting member is connected to a side of the liquid crystal screen. The screen for a laptop computer having a configuration described above has an integral appearance, which not only protects the screen but also makes the screen appear more neat enhancing visual effect of the screen. The present invention also proposes a laptop computer having the above screen so that the computer has an excellent visual appearance in usage, which is more adapted to practical use.

19 Claims, 5 Drawing Sheets

U.S. PATENT DOCUMENTS

| | | | |
|---|---|---|---|
| 7,679,894 B2 * | 3/2010 | Yue et al. | 361/679.26 |
| 2005/0286214 A1 | 12/2005 | Chen | |
| 2006/0002060 A1 * | 1/2006 | Ling | 361/679 |
| 2006/0002068 A1 * | 1/2006 | Kim | 361/683 |
| 2006/0023404 A1 * | 2/2006 | Ling | 361/681 |
| 2006/0023407 A1 * | 2/2006 | Ling | 361/683 |
| 2006/0256513 A1 * | 11/2006 | Yeh et al. | 361/681 |

\* cited by examiner fig. 1 fig. 2 fig. 3 fig. 4 fig. 5 fig. 6 fig. 7 fig. 8 fig. 9-1 fig. 9-2 fig. 10-1 fig. 10-2 fig. 11 fig. 12 fig. 13

SCREEN OF LAPTOP COMPUTER AND LAPTOP COMPUTER HAVING THE SAME

BACKGROUND OF THE INVENTION

1. Field of the Invention

The present invention relates to a screen of a laptop computer and a laptop computer having the same, more particularly to a screen of a laptop computer provided with a cover plate and a laptop computer having the same.

2. Description of the Related Art

As well known in the art, a screen for a laptop computer is very fragile, meanwhile, it is more easily to be smeared by dirt, even to be scratched, due to environmental influence, thus deteriorating visual effects. Chinese Patent Application No. 200510113452.1 discloses a screen appearance structure for a laptop computer, comprising a base and a screen mounted on the base, the screen comprising an inner surface and an external surface provided opposing to the inner surface with the inner surface having a screen. The screen appearance structure for the laptop computer further comprises a non-rigid material based assembly having an inner side face and an outer side face opposing to the inner side face, and the inner side face being attached to the outer surface of the screen, with the non-rigid material based component enclosing the external surface of the screen. However, there is a side frame on the periphery of the screen for the laptop computer. Due to the side frame, the entire visual appearance of the screen for the laptop computer is deteriorated.

From above, it is desirable to provide an improved screen for the laptop computer to overcome the disadvantages in the existing laptop computer.

SUMMARY OF THE INVENTION

An object of the invention relates to overcome the disadvantages of the laptop computer in the prior art by providing a novel screen for the laptop computer and a laptop computer having the same. And the technical problem to be solved relates to incorporate a transparent block on a surface of the screen for the laptop computer, so that the displaying surface of the entire laptop computer is neat and protected from being damaged and thereby is more adapted for practical use.

The object of the invention and the technical problem to be solved are achieved by the following solutions. According to an aspect of the invention, a screen device for a laptop computer is provided, comprising: a back cover; a fixing body mounted on the back cover; a liquid crystal screen mounted on the fixing body; and a cover plate received on the fixing body, wherein the cover plate covers the liquid crystal screen and the fixing unit, and the area of the cover plate corresponding to the liquid crystal screen is transparent.

The object of the invention and the technical problem to be solved are further achieved by the following technical measures.

Preferably, in the screen for the laptop computer, the fixing body comprises a fixing frame and at least one first supporting member set between the fixing frame and the liquid crystal screen, and one end of each one of the at least one first supporting member is connected with a side of the liquid crystal screen and the other end of each one of the at least one first supporting member is connected with the fixing frame.

Preferably, in the screen for the laptop computer, the fixing body comprises at least one second supporting member, each of the at least one second supporting member is connected to a side of the liquid crystal screen.

Preferably, in the screen for the laptop computer, there are 3 supporting members which are mounted respectively at the left, right and lower sides of the liquid crystal screen. Further, the supporting members are made of metal material.

Preferably, in the screen for the laptop computer, the back cover has pivot shafts connected with a host computer of the laptop computer, and an upper edge of a shaft cover of the pivot shaft is connected to a lower edge of the cover plate.

Preferably, in the screen for the laptop computer, the cover plate is adhered to the fixing body by adhesive.

Preferably, the screen for the laptop computer, further comprises at least one fixing unit affixed on the edge of the back surface of the cover plate, at least one through hole corresponding to the at least one fixing unit formed in the fixing body, wherein the cover plate and the fixing body are affixed together through the at least one fixing unit and the at least one through hole.

Preferably, in the screen for the laptop computer, the fixing body comprises: a base plate having a back surface, said back surface is connected to the cover plate; at least one fixing post, arranged on the base plate, each one of the at least one fixing post comprises a post body and a post head formed at one end of the post body, the diameter of the post head is larger than the diameter of the post body.

Preferably, in the screen for the laptop computer, at least one of the at least one fixing post has a longitudinal splitting slot.

Preferably, in the screen for the laptop computer, the post is made of rubber or plastic.

Preferably, the screen for the laptop computer further comprises at least one connecting post, at least one first fixing hole formed at the edge of the cover plate, at least one second fixing hole corresponding to the at least one first fixing hole formed the fixing body, wherein the cover plate and the fixing body are affixed together by the at least connecting post thrilling through the at least first fixing hole and the at least second fixing hole.

Preferably, in the screen for the laptop computer, each one of the at least one connecting post is "I" shape.

Preferably, in the screen for the laptop computer, each one of the at least connecting post has two ends, a longitudinal splitting slot is formed on one end of the two ends.

Preferably, in the screen for the laptop computer, the post is made of rubber or plastic.

Preferably, the screen for the laptop computer further comprises a magnetic frame attached to the back surface of the cover plate, the fixing frame is made of iron based material, and the cover plate is connected to the fixing frame by magnetic attracting force.

Preferably, the screen for the laptop computer further comprises a frame of made of iron material or magnetic material attached to the back surface of the cover plate, and the fixing frame is made of magnetic material, the cover plate and the fixing frame are connected via magnetic attracting force.

Preferably, in the screen for the laptop computer, the material of the cover plate is organic glass, glass or crystal.

Preferably, in the screen for the laptop computer, a gap between the cover plate and the back cover is filled by sealing material.

Preferably, in the screen for the laptop computer, the external surface of the cove plate is further provided with a layer of transparent-enhancing film.

The object of the invention and the technical problem to be solved are further achieved by the following solutions. According to an aspect of the invention, a laptop computer is provided, comprising: a host computer; a screen pivotally connected to the host computer. The screen comprises: a back cover; a fixing body mounted on the back cover; a liquid crystal screen received on the fixing body; and a cover plate mounted on the fixing body, wherein the cover plate covers the liquid crystal screen and the fixing unit, and the area of the cover plate corresponding to the liquid crystal screen is transparent.

Compared with prior art, the present invention has excellent advantages and beneficial effects. From above, in order to obtain the forgoing objects of the invention, the present invention provides a screen for a laptop computer and a laptop computer having the same. Since a cover plate is mounted outside the liquid crystal screen, and the cover plate entirely covers the liquid crystal screen and the fixing body, external screen is omitted from the laptop computer, so that the screen is neat. In addition, due to the existence of the cover plate, damage to the liquid crystal screen is effectively prevented, which is more adapted to practical use.

In all, the screen for the laptop computer having the above special structure and the laptop computer having the same provide many advantages and practical values over prior art. And there is no similar structure design in the field to be published or used, which involves inventive step and bring excellent and practical effects.

Further disclosure, objects, advantages and aspects of the present application may be better understood by those skilled in the relevant art by reference to the following description of preferred embodiments taken in conjunction with the accompanying drawings, which are given by way of illustration only, and thus are not limitative of the present invention.

BRIEF DESCRIPTION OF THE DRAWINGS

The present invention will be described in detail with reference to embodiments and attached drawings.

FIG. 9-1 and FIG. 9-2 are perspective views of the preferred embodiments of the connecting post according to an embodiment of the invention;

FIG. 10-1 and FIG. 10-2 are perspective views of the preferred embodiments of another connecting post according to an embodiment of the invention;

DETAILED DESCRIPTION OF THE PREFERRED EMBODIMENTS

The matter defined in the description such as a detailed construction and element are provided to assist in a comprehensive understanding of the embodiments of the invention. However, the present invention is not limited to these embodiments. A person skilled in the art will recognized that various changes and modifications of the embodiments described herein can made without departing from the scope and spirit of the invention. Also, like reference numbers denotes like elements throughout the specification.

Figure 1:
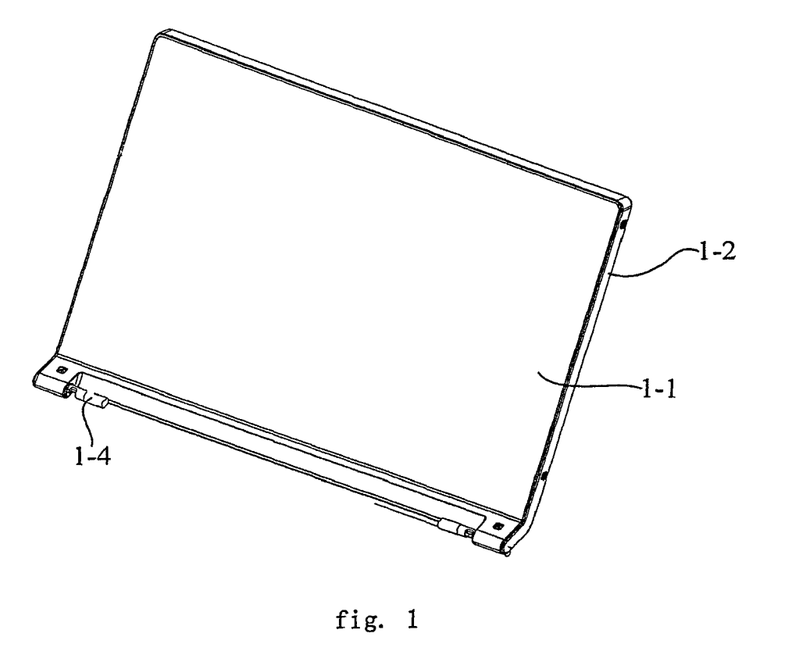
FIG. 1 is a schematic perspective view of a screen for a laptop computer according to an embodiment of the invention.

FIG. 1 is a schematic perspective view of a screen for a laptop computer according to an embodiment of the invention. The screen for the laptop computer comprises: a back cover 12 with a liquid crystal screen being mounted therein (not shown); a cover plate 11 for covering the front of the back cover to entirely cover components in the back cover 12 so that a side frame of the screen will not be directly exposed from the front of the screen; and a pivot shaft 14 mounted at the bottom part of the back cover 12 to connect with a host computer (or mainframe) of the laptop computer. In an exemplary embodiment of the invention, at least one part of the cover plate 11 covering the liquid crystal screen is transparent, whereas the part of the cover plate 11 covering the side frame of the screen is opaque, so that user can directly review the contents displayed on the screen with excellent visual appearance at the front part of the screen. Alternatively, the entire cover plate can be transparent.

Figure 2:
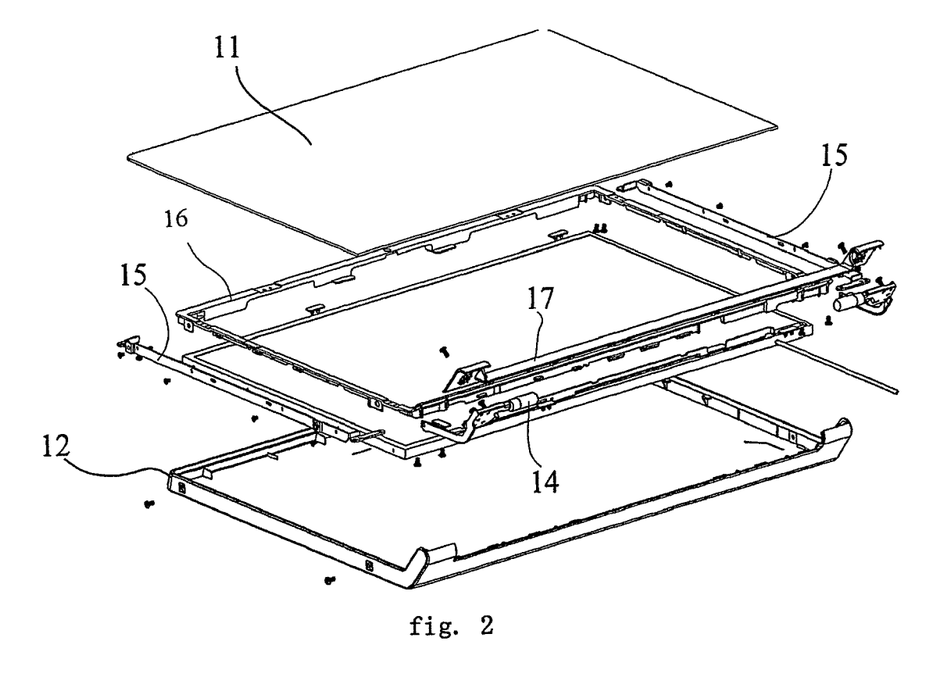
FIGS. 2 and 3 are exploded perspective views of the screen for the laptop computer according to the embodiment of the invention.
Figure 3:
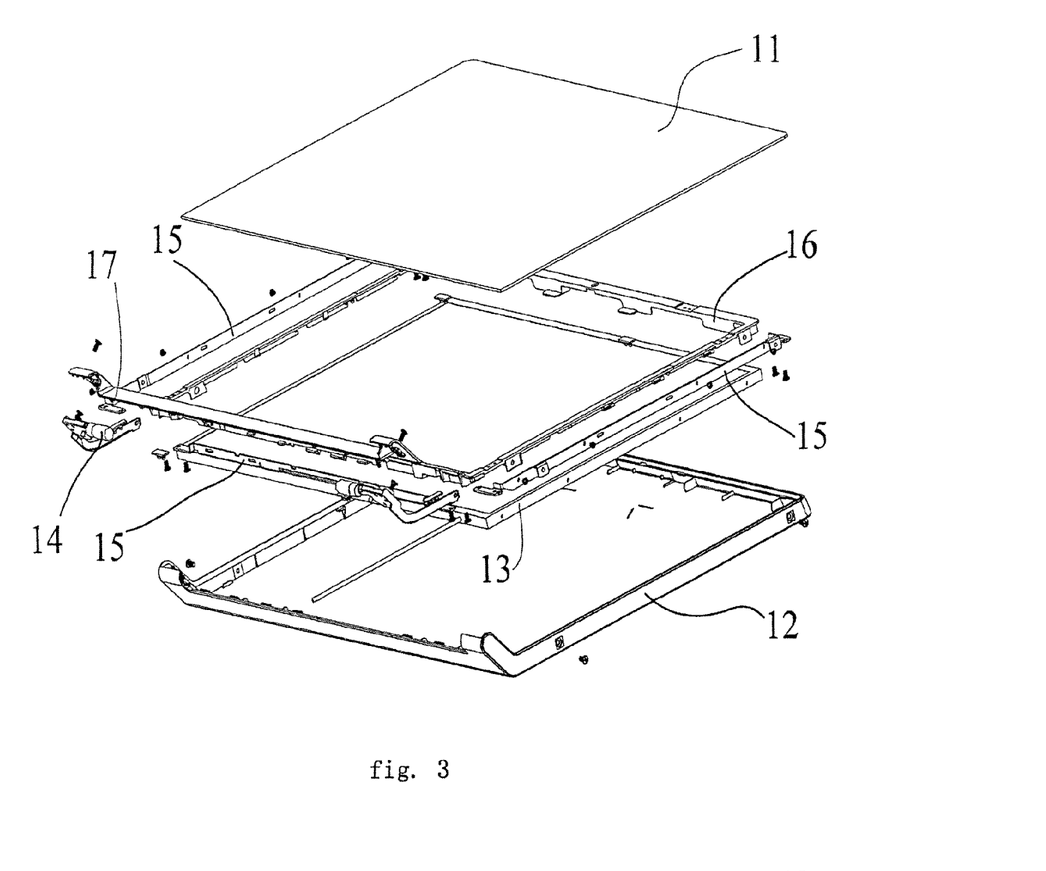

FIGS. 2 and 3 are exploded perspective views of the screen for the laptop computer according to the embodiment of the invention. In the screen for the laptop computer the back cover 12 is constructed as a case with a hollow structure; a fixing body is fixed inside the back cover 12 by screws. In a embodiment of the invention, the fixing body is constructed as a fixing frame 16; a liquid crystal screen 13 is mounted in the fixing frame 16 of the embodiment by screws; and a cover plate 11 is received on a fixing frame 16 of the embodiment and entirely covering the liquid crystal screen 13 and the fixing frame 16. And the back cover 12 is provided with a pivot shaft 14 connected with the host computer of the laptop computer, and an upper edge of a shaft cover 17 of the pivot shaft is connected with the lower edge of the cover plate 11. The material of the cover plate 11 is organic glass (also called acryl (methyl methacrylate)), glass or crystal. The screen for a laptop computer having a configuration described above has an integral appearance, which not only protects the screen but also makes the screen appear more neat enhancing visual effect of the screen.

Figure 4:
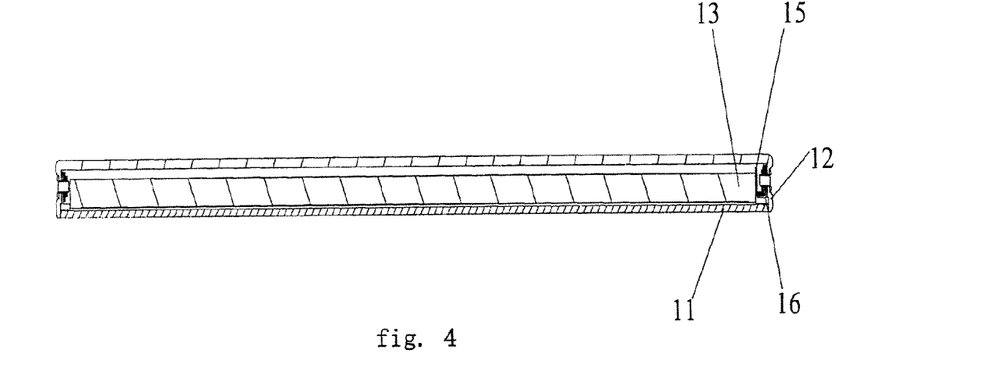
FIG. 4 is a sectional schematic view of the screen for the laptop computer according to the embodiment of the invention.

Referring to FIGS. 2-4, FIG. 4 is a sectional schematic view of the screen for the laptop computer according to the embodiment of the invention. The fixing frame in the embodiment of the invention is generally made of plastic, however, the material is not limited thereto. Thus, in another preferred embodiment of the invention, to increase the supporting strength of the fixing frame, at least one supporting member 15 is disposed between the fixing frame and the liquid crystal screen, each supporting member 15 is connected to a side of the liquid crystal screen 13 by screws, and each supporting member 15 further fixed to the fixing frame 16 by screws. Preferably, there are 3 supporting members 15 which are respectively mounted at the left side, right side and lower side of the liquid crystal screen 13. To increase the supporting strength thereof, the supporting members 15 can be made of metal, such as iron, aluminum alloy and the like. Preferably, in the above embodiment, the fixing frame can be omitted and the liquid crystal screen is directly mounted to the supporting member fixed to the back cover 12 while achieving the same effect of fixing the liquid crystal screen.

Figure 5:
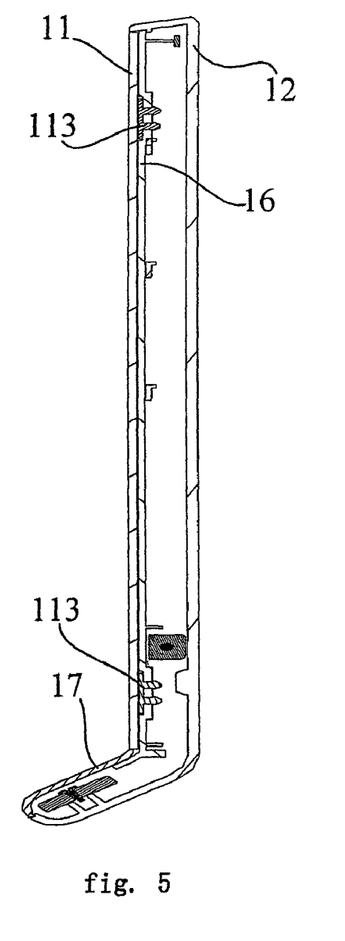
FIG. 5 is a sectional view when the cover plate is fixed by a connecting member.
Figure 6:
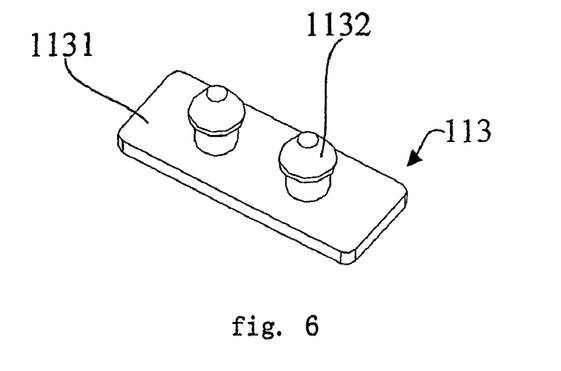
FIGS. 6 and 7 are perspective views of a preferred embodiment of the connecting member according to an embodiment of the invention.
Figure 7:
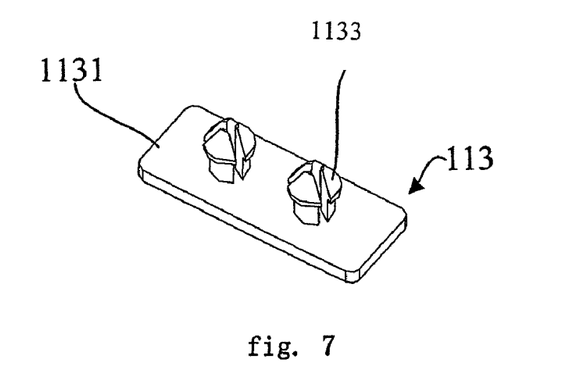
Figure 8:
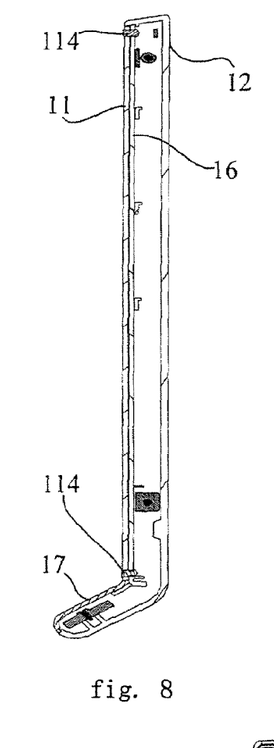
FIG. 8 is a schematic sectional view when the cover plate is fixed by a connecting post.

In the above embodiment, the cover plate 11 is adhered to the fixing frame 16 by adhesive. And the connecting manner of the cover plate 11 with the fixing frame 16 can be selected as the following manners:

Referring to FIG. 5, a plurality of fixing members 113 are positioned at peripheral edges of the cover plate 11, and frame fixing holes (also called fixing holes for the fixing body) corresponding to the fixing members are also positioned on the fixing frame 16. The fixing members 113 are stuck in the frame fixing holes, and the cover plate 11 is fixed to the fixing frame 16. The fixing member 113 comprises: a base plate 1131, at the back of which the cover plate 11 is connected via adhesive; at least one fixing post 1132, for example, two fixing posts shown in FIG. 6, positioned on the base plate 1131, wherein the fixing post comprises a post body and a post head mounted at an end of the post body, and the post head has a truncated cone shape having a diameter larger than that of the post body with the bottom of the post head being a flat plane. The pest head fixing post 1132 is made of rubber, and the post head of the fixing post engages with the frame fixing holes by interference. Due to the rubber being a kind of soft material, the post heads rebounds to be expanded when inserted by the elasticity of the rubber contracting into the fixing holes so that the frame fixing holes are hooked after mounting in place, thus the cover plate 11 is securely fixed to the fixing frame 16 and it is ensured that the fixing post will not be pulled out easily. FIG. 7 is a schematic view of the splitting fixing post 1133 according to an embodiment of the invention. Compared with the above fixing post, the fixing post is a longitudinal splitting shape with gaps between the split portions. Due to the gaps, each of the split portions can be contracted toward the center so that they can penetrate through the frame fixing holes when mounting and reset after penetration, so that the cover plate 11 and the fixing frame 16 are fixed. The fixing posts of the embodiments can use plastic.

Fixing members are adhered or mounted on the inner surface of the cover plate 11 and the cover plate 11 is fixed to the fixing frame 16 in all of the above connecting manners, so all of the members except for the cover plate 11 hide behind the back face of the transparent plate which makes the surface of the transparent plate more neat.

Figure 11:
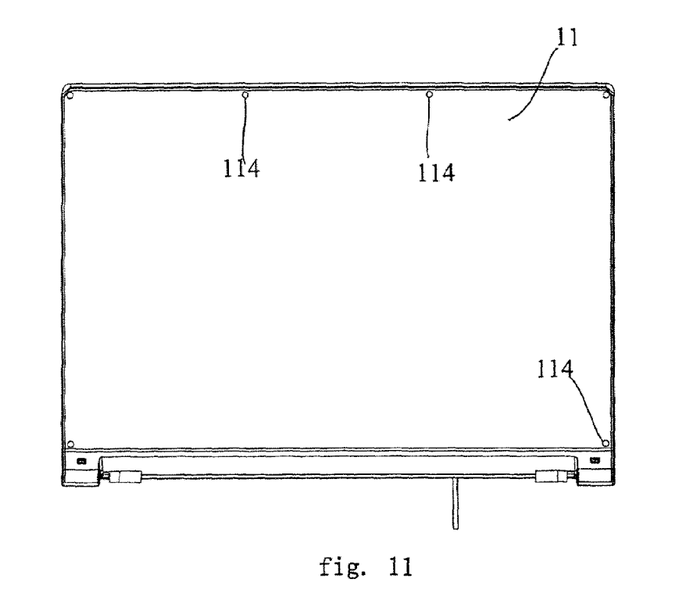
FIG. 11 is schematic external view of a screen in which the cover plate is fixed by the connecting post.

FIGS. 8-11 are a schematic view of another preferred embodiment of the invention. In the embodiment, a plurality of fixing holes (not shown) for the cover plate are positioned at the edge of the cover plate 11. And frame fixing holes corresponding to the fixing holes for the cover plate are positioned on the fixing frame 16. The cover plate 11 and the fixing frame 16 are fixed through the connecting post 114 passing through the fixing holes for the cover plate and the frame fixing holes. As shown in FIG. 9-1 and FIG. 9-2, the connecting post 114 has a "I" shaped structure with a thinner middle portion and two thicker ends. The connecting post 114 is made of rubber, and the post head of the connecting post and the frame fixing holes are interferentially fixed. Due to the rubber being a kind of soft material, the post heads rebounds to be expanded when inserted by the elasticity of the rubber contracting into the fixing holes so that the frame fixing holes are hooked after mounting in place, thus the cover plate 11 is securely fixed to the fixing frame 16 and it is ensured that the fixing post will not be pulled out easily. Further referring to FIGS. 10-1, 10-2, the post body of the connecting post and an end thereof has a longitudinal splitting shape with gaps between the split portions. Due to the gaps, each of the split portions can be contracted toward the center so that they can penetrate through the frame fixing holes when mounting and reset after penetration, so that the cover plate 11 and the fixing frame 16 are fixed. The connecting post can be made of plastic. The appearance of the screen fixed by the connecting post is shown in FIG. 11, and a plurality of post heads of the connecting posts 114 can be viewed at the side edge of the cover plate 11.

Figure 12:
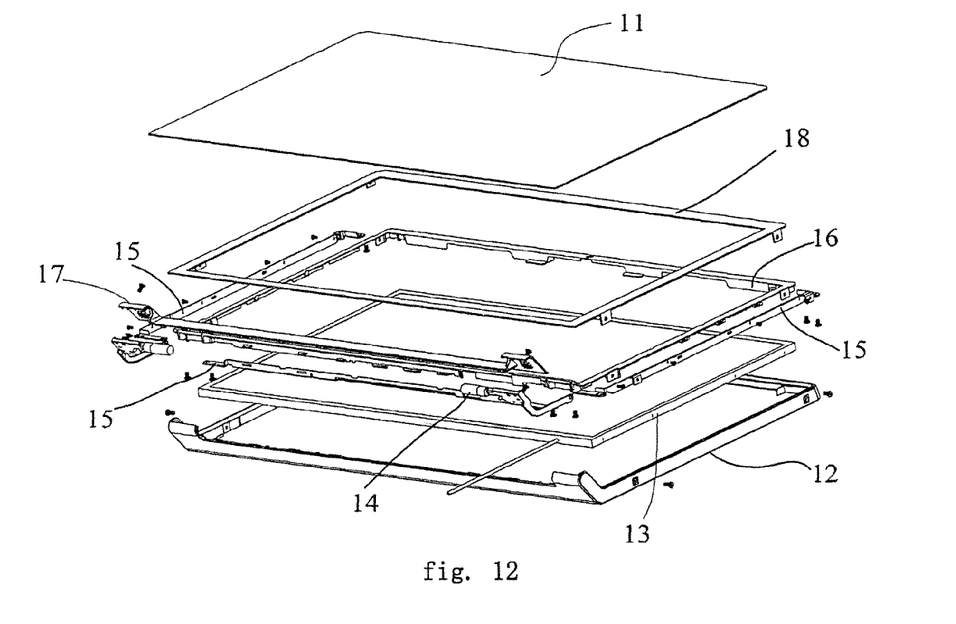
FIG. 12 is an exploded perspective view of a screen for a laptop computer according to another embodiment of the invention.

FIG. 12 is a perspective view according to a preferred embodiment of the invention. The screen for the laptop computer, besides the above structural components, further comprises a frame 18 which is attached at the back face of the cover plate. The frame 18 is a magnetic one whereas the fixing frame 16 is made of iron material. And the cover plate 11 and the fixing frame 16 are fixed by magnetic attracting force, or the frame 18 can be made of iron material which is attached to the back face of the cover plate whereas the fixing frame 16 is made of magnetic material, and the cover plate 11 and the fixing frame 16 are fixed by magnetic attracting force. Further, both of the frame 18 and the fixing frame 16 can be made of magnetic material, however, the corresponding faces have different magnetic poles. According to the principle of opposite poles attracting each other of magnetic material, the cover plate 11 and the fixing frame 16 are fixed by magnetic force.

In an exemplary embodiment of the invention, the gap between the cover plate 11 and the back cover 12 is filled by sealing material so that dust and moisture are prevented from entering inside the screen. Further, there is a layer of transparent-enhancing film on the outer surface of the cover plate, so that the displaying effect is improved.

Figure 13:
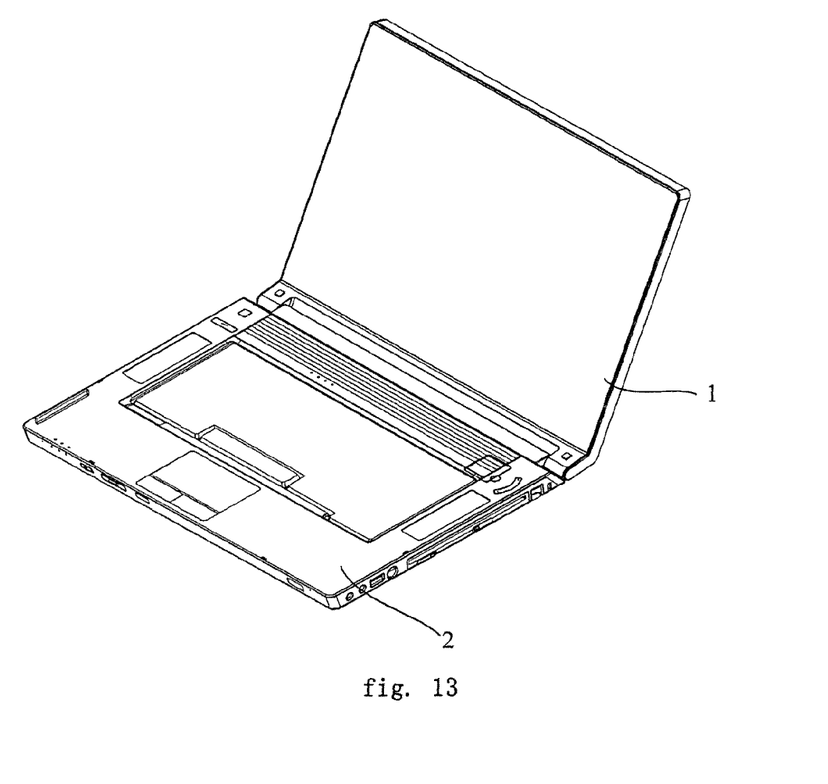
FIG. 13 is a perspective schematic view of a laptop computer according to an embodiment of the invention.
Figure 91:
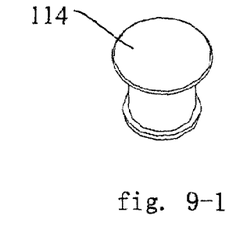
Figure 92:
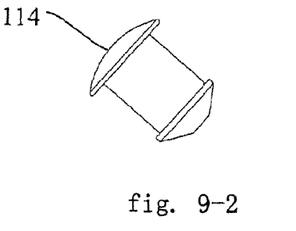
Figure 101:
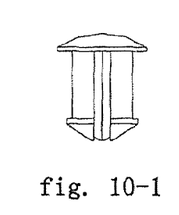
Figure 102:
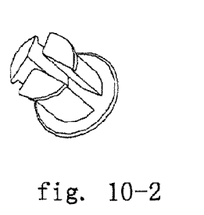

FIG. 13 is a perspective view of a laptop computer according to an exemplary embodiment of the invention. The laptop computer comprises a mainframe 2 and a screen 1, and the mainframe 2 and the screen 1 are connected by a pivot shaft (not shown in the figure). The screen 1 is the one having the cover plate proposed in the exemplary embodiment of the invention, since the structure of the screen are described in detail already, the description thereof is hereby omitted for clarity purpose. The laptop computer according to the embodiment of the invention achieves the integration of the screen with the side frame in conventional screen being invisible, which can obtain better visual effects. And the cover plate provides better protection of the liquid crystal screen, which is more adapted for practical use.

While the invention has been illustrated and described in detail in the drawing and foregoing description, the same is to be considered as illustrative and not restrictive in character, it being understood for those skilled I the art that only the preferred embodiment has been shown and described and that all changes, equivalents, and modifications that come within the spirit of the invention defined by following claims are desired to be protected.

The invention claimed is:

1. A screen device for a laptop computer, comprising:
a back cover;
a fixing body mounted on the back cover;
a liquid crystal screen received on the fixing body; and
a cover plate mounted on the fixing body,
wherein the cover plate covers the liquid crystal screen and the fixing body, and the area of the cover plate corresponding to the liquid crystal screen is transparent,
wherein the screen device further comprises: at least one fixing unit affixed on the edge of the back surface of the cover plate, at least one through hole corresponding to the at least one fixing unit formed in the fixing body, wherein the cover plate and the fixing body are affixed together through the at least one fixing unit and the at least one through hole, and
the fixing body comprises:
a base plate having a back surface, said back surface is connected to the cover plate; and at least one fixing post, arranged on the base plate, each one of the at least one fixing post comprises a post body and a post head formed at one end of the post body, the diameter of the post head is larger than the diameter of the post body.

2. The screen device for a laptop computer according to claim 1, wherein the fixing body comprises a fixing frame and at least one first supporting member set between the fixing frame and the liquid crystal screen, and one end of each one of the at least one first supporting member is connected with a side of the liquid crystal screen and the other end of each one of the at least one first supporting member is connected with the fixing frame.

3. The screen device for a laptop computer according to claim 1, wherein the fixing body comprises at least one supporting member, each of the at least one second supporting member is connected to a side of the liquid crystal screen.

4. The screen device for a laptop computer according to claim 1, wherein the back cover has pivot shafts connected with a host computer of the laptop computer, and an upper edge of a shaft cover of the pivot shaft is connected to a lower edge of the cover plate.

5. The screen device for a laptop computer according to claim 1, wherein the cover plate is adhered to the fixing body by adhesive.

6. The screen device for a laptop computer according to claim 1, wherein at least one of the at least one fixing post has a longitudinal splitting slot.

7. A screen device for a laptop computer, comprising: a back cover; a fixing body mounted on the back cover; a liquid crystal screen received on the fixing body; and a cover plate mounted on the fixing body, wherein the cover plate covers the liquid crystal screen and the fixing body, and the area of the cover plate corresponding to the liquid crystal screen is transparent, wherein the screen device further comprises at least one connecting post, at least one first fixing hole formed at the edge of the cover plate, at least one second fixing hole corresponding to the at least one first fixing hole formed the fixing body, wherein the cover plate and the fixing body are affixed together by the at least connecting post thrilling through the at least first fixing hole and the at least second fixing hole.

8. The screen device for a laptop computer according to claim 7, wherein each one of the at least one connecting post is "I" shape.

9. The screen device for a laptop computer according to claim 7, wherein each one of the at least connecting post has two ends, a longitudinal splitting slot is formed on one end of the two ends.

10. The screen device for a laptop computer according to claim 1, further comprising a magnetic frame attached to the back surface of the cover plate, the fixing frame is made of iron based material, and the cover plate is connected to the fixing frame by magnetic attracting force.

11. The screen device for a laptop computer according to claim 1, further comprising a frame of made of iron material or magnetic material attached to the back surface of the cover plate, and the fixing frame is made of magnetic material, the cover plate and the fixing frame are connected via magnetic attracting force.

12. The screen device for a laptop computer according to claim 1, wherein the material of the cover plate is organic glass, glass or crystal.

13. The screen device for a laptop computer according to claim 1, wherein a gap between the cover plate and the back cover is filled by sealing material.

14. The screen device for a laptop computer according to claim 1, wherein the external surface of the cove plate is further provided with a layer of transparent-enhancing film.

15. A laptop computer, comprising:
a host computer;
a screen pivotally connected to the host computer, the screen comprising:
a back cover;
a fixing body mounted on the back cover;
a liquid crystal screen received on the fixing body; and
a cover plate mounted on the fixing body,
wherein the cover plate covers the liquid crystal screen and the fixing body, and the area of the cover plate corresponding to the liquid crystal screen is transparent,
wherein the screen further comprises: at least one fixing unit affixed on the edge of the back surface of the cover plate, at least one through hole corresponding to the at least one fixing unit formed in the fixing body, wherein the cover plate and the fixing body are affixed together through the at least one fixing unit and the at least one through hole, and
the fixing body comprises:
a base plate having a back surface, said back surface is connected to the cover plate;
at least one fixing post, arranged on the base plate, each one of the at least one fixing post comprises a post body and a post head formed at one end of the post body, the diameter of the post head is larger than the diameter of the post body.

16. The laptop computer according to claim 15, wherein the cover plate is adhered to the fixing body by adhesive.

17. The laptop computer according to claim 15, further comprising a magnetic frame attached to the back surface of the cover plate, the fixing frame is made of iron based material, and the cover plate is connected to the fixing frame by magnetic attracting force.

18. The laptop computer according to claim 15, further comprising a frame of made of iron material or magnetic material attached to the back surface of the cover plate, and the fixing frame is made of magnetic material, the cover plate and the fixing frame are connected via magnetic attracting force.

19. A laptop computer, comprising:
a host computer;
a screen pivotally connected to the host computer, the screen comprising:
a back cover;
a fixing body mounted on the back cover;
a liquid crystal screen received on the fixing body; and
a cover plate mounted on the fixing body,
wherein the cover plate covers the liquid crystal screen and the fixing body, and the area of the cover plate corresponding to the liquid crystal screen is transparent, and
the screen further comprises at least one connecting post, at least one first fixing hole formed at the edge of the cover plate, at least one second fixing hole corresponding to the at least one first fixing hole formed the fixing body, wherein the cover plate and the fixing body are affixed together by the at least connecting post thrilling through the at least first fixing hole and the at least second fixing hole.

* * * * *